United States Patent
Lee et al.

(10) Patent No.: US 9,557,470 B2
(45) Date of Patent: Jan. 31, 2017

(54) LIGHT SOURCE MODULE

(71) Applicants: Hsin-Hung Lee, Hsin-Chu (TW);
Chiao-Chih Yang, Hsin-Chu (TW);
Wei-Ching Wu, Hsin-Chu (TW);
Hung-Sen Lin, Hsin-Chu (TW)

(72) Inventors: Hsin-Hung Lee, Hsin-Chu (TW);
Chiao-Chih Yang, Hsin-Chu (TW);
Wei-Ching Wu, Hsin-Chu (TW);
Hung-Sen Lin, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 819 days.

(21) Appl. No.: 13/848,065

(22) Filed: Mar. 21, 2013

(65) Prior Publication Data
US 2013/0250611 A1 Sep. 26, 2013

(30) Foreign Application Priority Data
Mar. 21, 2012 (TW) .............................. 101109713 A

(51) Int. Cl.
*F21V 7/04* (2006.01)
*F21V 8/00* (2006.01)

(52) U.S. Cl.
CPC .............. *G02B 6/005* (2013.01); *G02B 6/0021* (2013.01); *G02B 6/0055* (2013.01); *G02B 6/0043* (2013.01); *G02B 6/0058* (2013.01)

(58) Field of Classification Search
CPC ......... G02B 6/005; G02B 6/0013; G02B 6/42; G02B 6/0021; G02B 6/004; G02B 6/0043
(Continued)

(56) References Cited

U.S. PATENT DOCUMENTS

| 7,588,364 B2 * | 9/2009 | Kitamura | G02B 6/008 362/224 |
|---|---|---|---|
| 2011/0141764 A1 | 6/2011 | Lin et al. | |
| 2011/0242794 A1 | 10/2011 | Nakamura et al. | |

FOREIGN PATENT DOCUMENTS

| CN | 1393729 | 1/2003 |
|---|---|---|
| JP | 2010045029 | 2/2010 |

(Continued)

OTHER PUBLICATIONS

"Office Action of Taiwan Counterpart Application", issued on Sep. 24, 2014, p. 1-p. 4.

*Primary Examiner* — Andrew Coughlin
*Assistant Examiner* — Meghan Ulanday
(74) *Attorney, Agent, or Firm* — Jianq Chyun IP Office

(57) ABSTRACT

A light source module including a light guide plate, at least one light emitting device, a light-controlling pattern element, and an absorbing pattern element is provided. The light guide plate has a light emitting surface, a first surface opposite the light emitting surface, and at least one opening. The opening passes through the first surface and extends from the first surface toward the light emitting surface. The at least one light emitting device is disposed in the opening and arranged along an arranging direction. The light-controlling pattern element is disposed on the light emitting surface and covers the opening and the light emitting device. The opening faces towards the absorbing pattern element. The absorbing pattern element is disposed besides one of the at least one light emitting device and extends toward a side wall of the opening. Moreover, another two light source modules are also provided.

39 Claims, 10 Drawing Sheets

(58) Field of Classification Search
USPC .................................................. 362/606, 607
See application file for complete search history.

(56) References Cited

FOREIGN PATENT DOCUMENTS

| | | |
|---|---|---|
| JP | 2010123459 | 6/2010 |
| JP | 2010-177085 | 8/2010 |
| JP | 2011-076999 | 4/2011 |
| JP | 2011-222287 | 11/2011 |
| KR | 101114774 | 3/2012 |
| TW | 200823556 | 6/2008 |
| TW | 200921149 | 5/2009 |
| TW | M366080 | 10/2009 |
| TW | M368093 | 11/2009 |
| TW | I346814 | 8/2011 |
| TW | M416720 | 11/2011 |
| TW | I354812 | 12/2011 |
| TW | I358004 | 2/2012 |

* cited by examiner

LIGHT SOURCE MODULE

CROSS-REFERENCE TO RELATED APPLICATION

This application claims the priority benefit of Taiwan application serial no. 101109713, filed on Mar. 21, 2012. The entirety of the above-mentioned patent application is hereby incorporated by reference herein and made a part of this specification.

BACKGROUND

Field of the Invention

The invention relates to a light source module, and more particularly, the invention relates to a light source module including a light-controlling pattern element.

Description of Related Art

A conventional light source module includes a light guide plate having a plurality of recesses, a plurality of light emitting diode light bars disposed in the recesses, at least one reflecting element and at least one optical film. The light emitting diode light bars are located between the reflecting element and the light guide plate. The light guide plate is located between the optical film and the light emitting diode light bars. In the conventional light source module, although most light emitted by the light emitting diode light bars enters the light guide plate from side walls of the recesses via a direction perpendicular to a light emitting surface of the light guide plate, a portion of the light exits the light emitting surface of the light guide plate from the top of the light emitting diode light bars and causes a problem of the conventional light source module being overly bright at the top of the light emitting diode light bars. In addition, the conventional light source module may be divided into a plurality of regions by the plurality of recesses, and a problem of uneven light mixing is prone to occur at an interception point of each region and the adjacent region, thus resulting in a poor uniformity.

Japanese Patent No. 2010177085 discloses a backlight unit including a light guide body, and a light emitting surface of the light guide body is disposed with a light diffusive member. Japanese Patent No. 2009230163 discloses a backlight unit, and a spacing between a light guide plate and a diffusive member thereof is less than 15 mm. Japanese Patent No. 2010090029 discloses a backlight unit, and a light emitting surface of a light guide plate and a surface opposite to the light emitting surface are disposed with diffusion points. Taiwanese Patent No. I354812 discloses a backlight module including a light source, a light guide plate, and a reflection sheet. Taiwanese Patent No. I358004 discloses a backlight module including a light guide plate and at least one light source optically coupled with the light guide plate. Taiwanese Patent No. M366080 discloses a backlight module including an optical film, and this optical film has a diffusion layer and a reflection layer. US Patent No. 20110141764 discloses a backlight module including a reflection cavity. Chinese Patent No. 01122554 discloses a light guide plate, wherein a groove is disposed at a middle section thereof Taiwanese Patent No. M368093 discloses a sidelight type backlight module including a plurality of light guide plates, a plurality of light sources, a plurality of shielding plates, a diffusion film, a brightness enhancement film, and a reflection plate. US Patent No. 20110242794 discloses a light emitting device having a plurality of light guide plates.

SUMMARY OF THE INVENTION

The invention provides a light source module capable of improving a problem of a conventional light source module being overly bright at the top of a light emitting diode light bar.

The invention provides another light source module capable of improving a problem of uneven light mixing of a conventional light source module.

The invention further provides a light source module capable of improving a problem of uneven light mixing of a conventional light source module.

Other objectives and advantages of the invention may be known and further understood from technical features disclosed herein.

In order to achieve a partial or all objectives mentioned above or other objectives, a light source module is provided in one embodiment of the invention. This light source module includes a light guide plate, at least one light emitting device, a light-controlling pattern element, and an absorbing pattern element. The light guide plate has a light emitting surface, a first surface opposite the light emitting surface, and at least one opening. The opening passes through the first surface and extends from the first surface toward the light emitting surface. The light emitting device is disposed in the opening and arranged along an arranging direction. The light-controlling pattern element is disposed on the light emitting surface and covers the opening and the light emitting device. The opening faces towards the absorbing pattern elements. Each absorbing pattern element is disposed besides the light emitting device and extends toward a side wall of the opening.

A light source module is further provided in another embodiment of the invention. This light source module includes a light guide plate, at least one light emitting device, a light-controlling pattern element, and at least one optical film. The light guide plate has a light emitting surface, a first surface opposite the light emitting surface, and at least one opening The opening passes through the first surface and extends from the first surface towards the light emitting surface. The light emitting device is disposed in the opening and arranged along an arranging direction. The light-controlling pattern element is disposed on the light emitting surface and covers the opening and the light emitting device. The light-controlling pattern element is disposed between the light emitting surface and the optical film. A minimum width of the light-controlling pattern element in a first direction is a. The first direction intersects with the arranging direction. A shortest distance from the light emitting surface to the optical film is h. Wherein, a and h satisfy a≤h.

A light source module is also provided in another embodiment of the invention. This light source module includes a light guide plate, at least one light emitting device, a light-controlling pattern element, and at least one optical film. The light guide plate has a light emitting surface, a first surface opposite the light emitting surface, and at least one opening. The opening passes through the first surface and extends from the first surface towards the light emitting surface. The light emitting device is disposed in the opening and arranged along an arranging direction. The light-controlling pattern element is disposed on the light emitting surface and covers the opening and the light emitting device. The light-controlling pattern element has at least one first hole. A shortest distance between an edge of the first hole and an edge of the light-controlling pattern element is d1. The light-controlling pattern element is disposed between the light emitting surface and the optical film. A shortest distance from the light emitting surface to the optical film is h. Wherein, d1 and h satisfy d1≤h.

According to the foregoing, in the light source module of one embodiment of the invention, the absorbing pattern element may absorb a portion of light beam transmitting to a reflecting element, so as to improve the problem of the conventional light source module being overly bright at the tope of the light emitting device.

In the light source module of another embodiment of the invention, the light source module may effectively be avoided from having a problem of uneven light mixing near the light-controlling pattern element via properly designing a width of the light-controlling pattern element and a shortest distance between the light guide plate and the optical film.

In the light source module of another embodiment of the invention, the light-controlling pattern element of the light source module has at least one first hole, the light source module may be avoided from having a problem of uneven light mixing near the light-controlling pattern element via a shortest distance between an edge of the first hole and an edge of the light-controlling pattern element and a shortest distance from the light emitting surface to the optical film.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
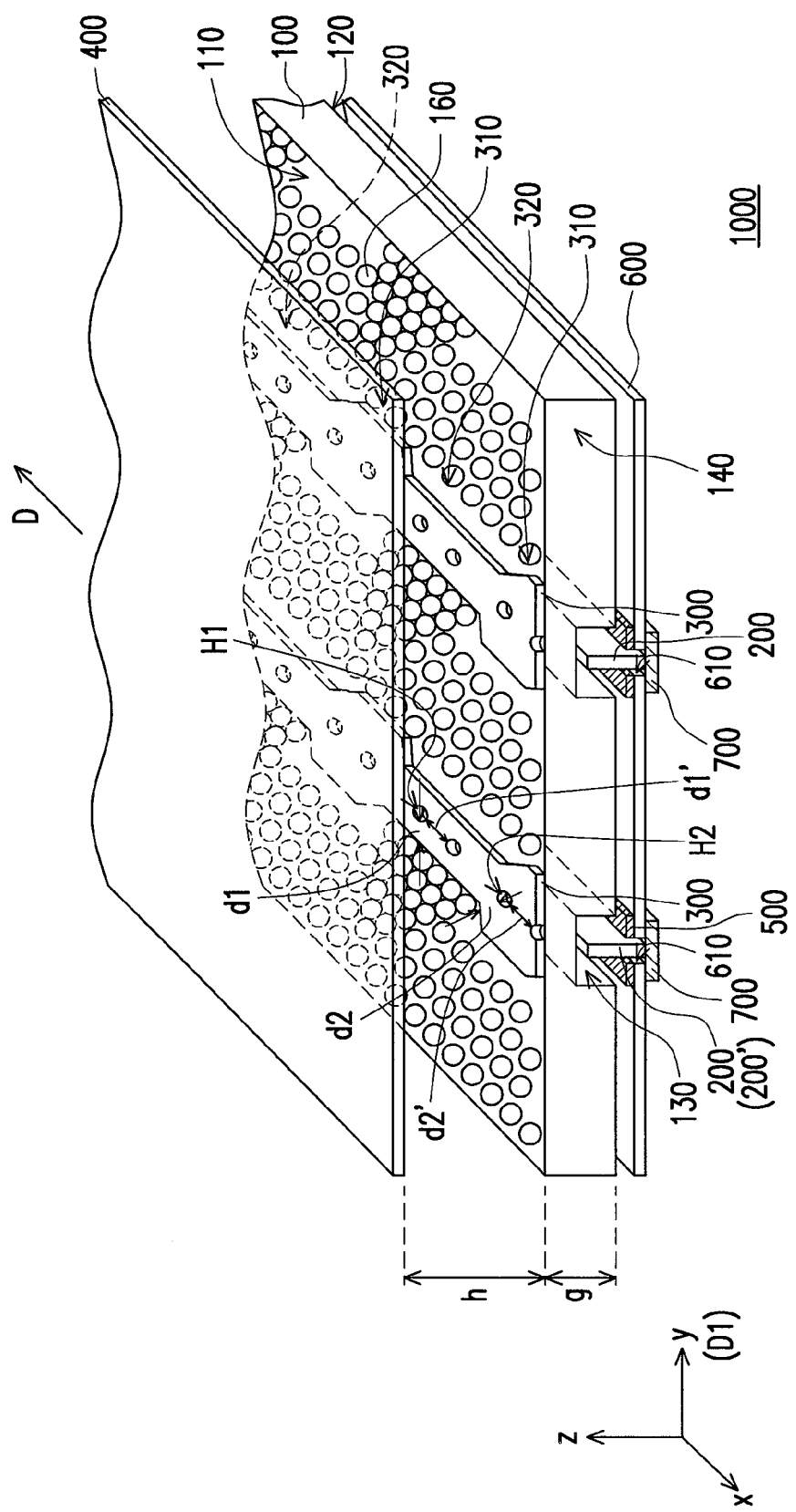
FIG. 1 is a partial schematic perspective view of a light source module according to an embodiment of the invention.
Figure 2:
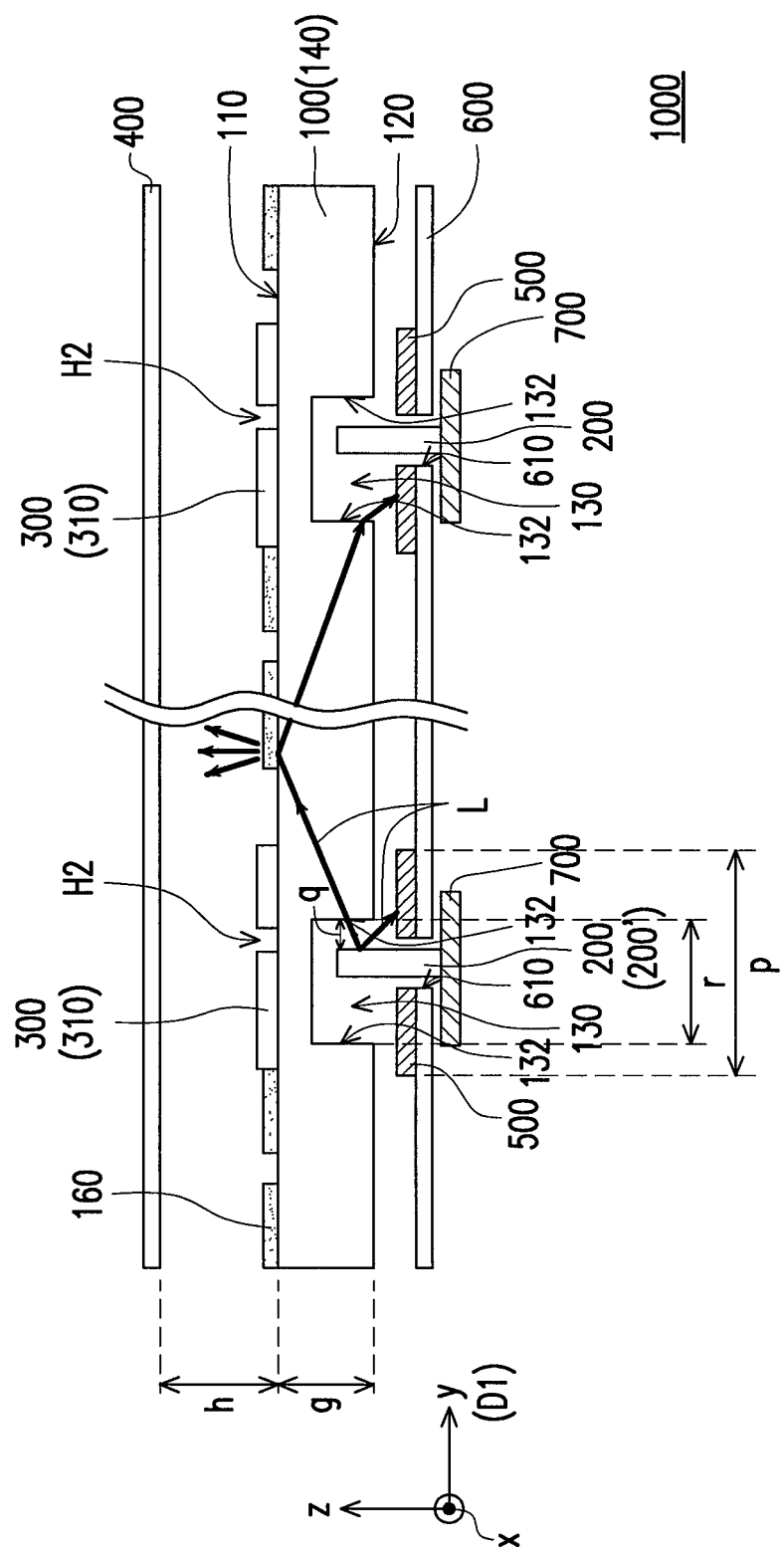
FIG. 2 is a side view of FIG. 1.

Referring to FIG. 1 and FIG. 2, a light source module 1000 of the embodiment includes a light guide plate 100, at least one light emitting device 200, and a light-controlling pattern element 300. The light source module 1000 of the embodiment may further selectively include at least one optical film 400. FIG. 1 and FIG. 2 illustrate a plurality of light emitting devices 200, two light-controlling pattern elements 300, and a piece of optical film 400. However, the invention does not limit the amount of the light emitting device, light-controlling pattern element, or the optical film, the amount thereof may be properly designed depending on an actual need.

Figure 3:
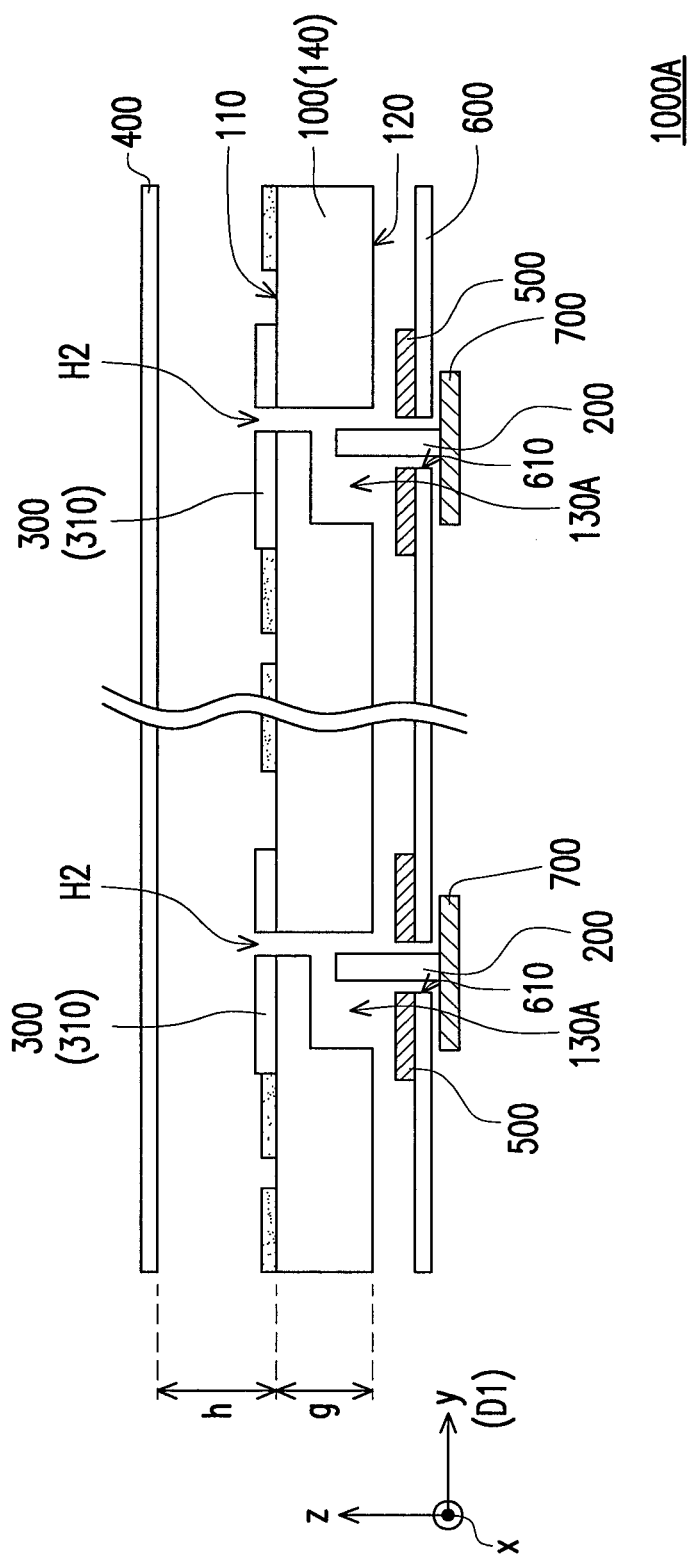
FIG. 3 is a partial side view of a light source module according to another embodiment of the invention.

Continually referring to FIG. 1 and FIG. 2, the light guide plate 100 of the embodiment has a light emitting surface 110, a first surface 120 disposed opposite the light emitting surface 110, and at least one opening 130. The opening 130 passes through the first surface 120 and extends from the first surface 120 towards the light emitting surface 110. In the embodiment, the opening 130 does not pass through the light emitting surface 110 of the light guide plate 100. However, the invention is not limited thereto, and in other embodiments, the opening may also pass through the light emitting surface of the light guide plate. Referring to FIG. 3, a light source module 1000A in FIG. 3 is similar to the light source module 1000 in FIG. 2, and therefore same elements are represented with the same notations. A difference between the light source module 1000A and the light source module 1000 is that: the format of an opening 130A in FIG. 3 is slightly different from the format of the opening 130 in FIG. 2. Specifically, in the light source module 1000A, the opening 130A may pass through the first surface 120 and the light emitting surface 110.

Figure 4A:
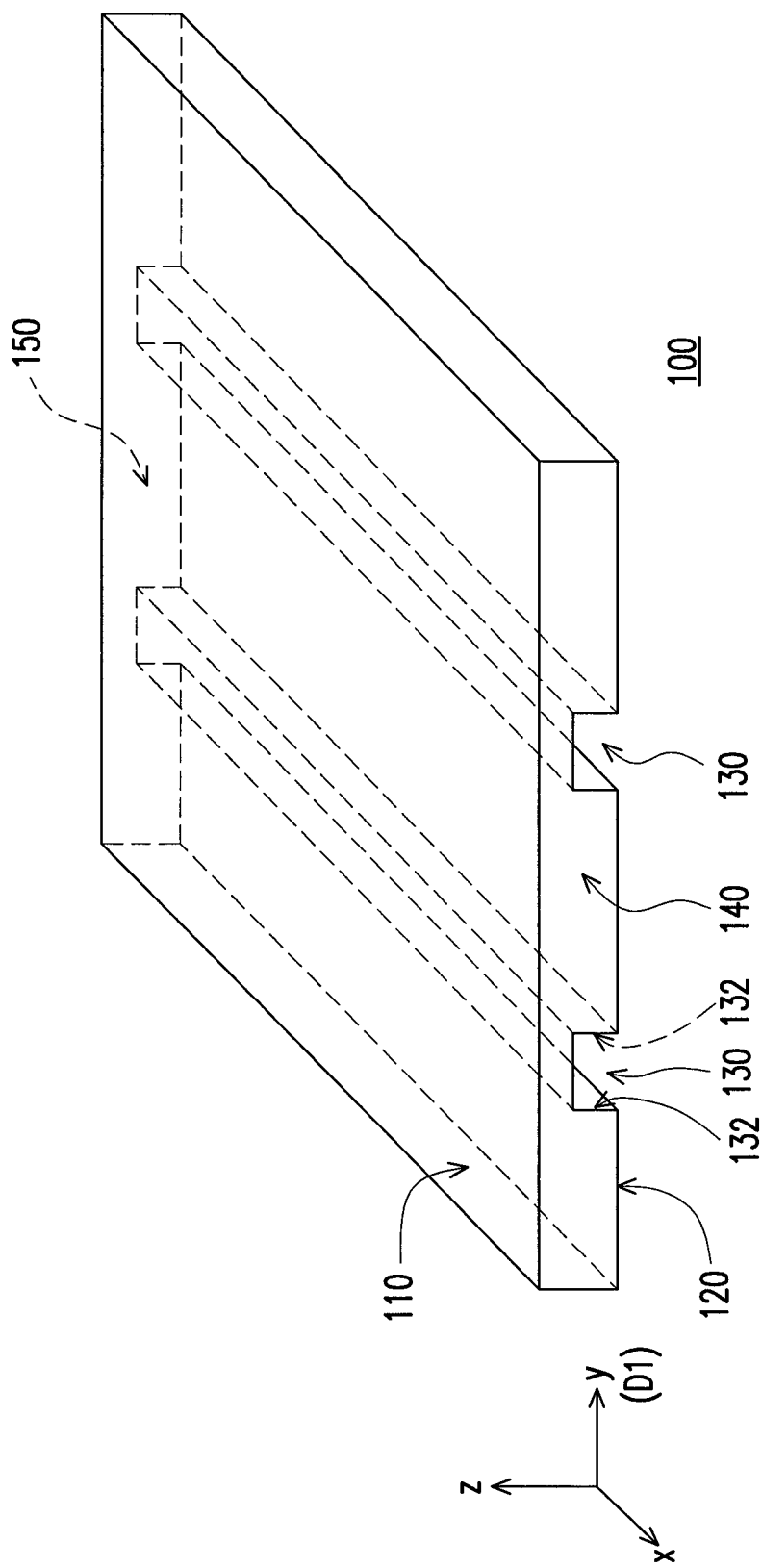
FIG. 4A illustrates a light guide plate of FIG. 1.
Figure 4B:
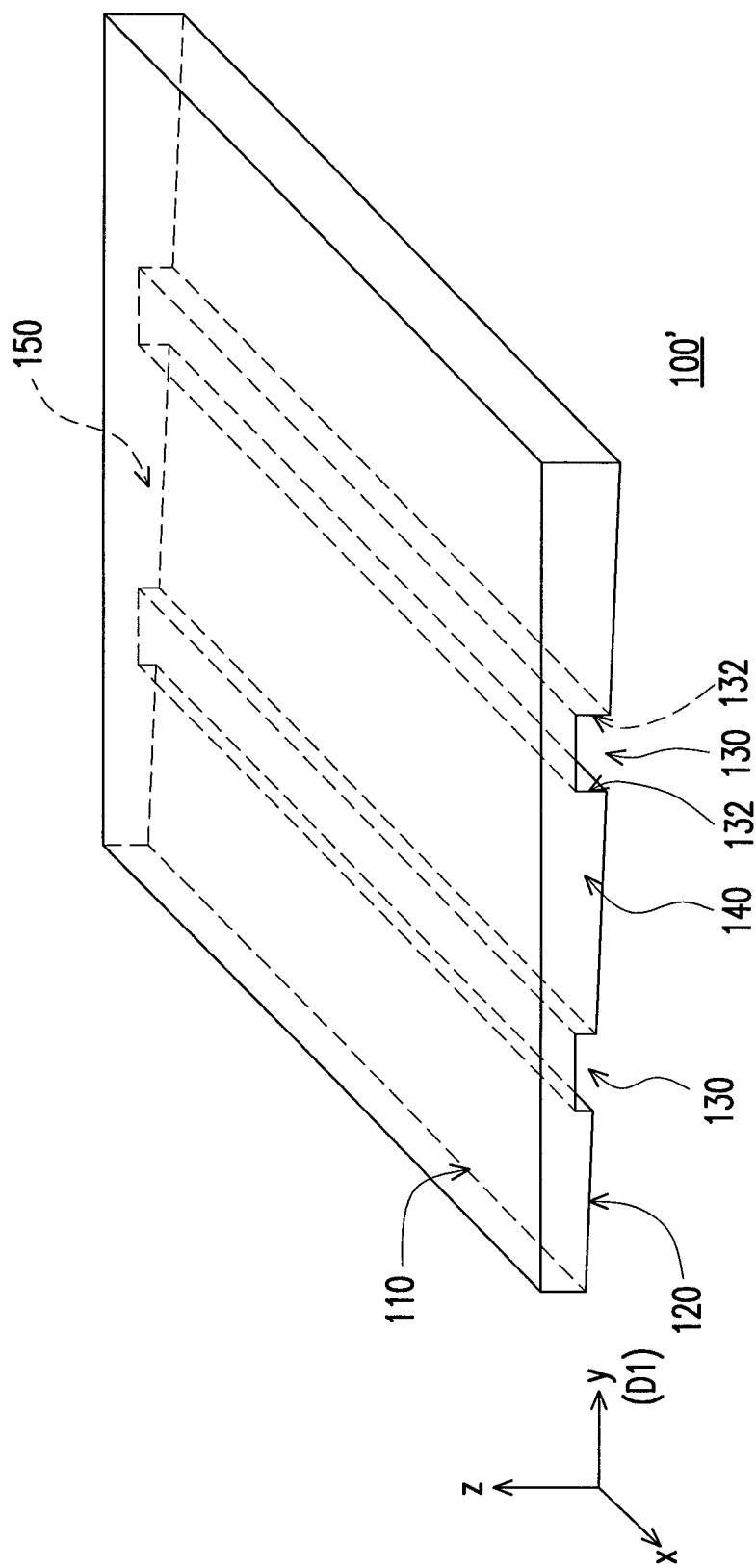
FIG. 4B illustrates a light guide plate according to another embodiment of the invention.

Referring to FIG. 1 and FIG. 4A, the light guide plate 100 of the embodiment further has a second surface 140 and a third surface 150 disposed opposite the second surface 140 (labeled in FIG. 4A). The second surface 140 is connected with the light emitting surface 110 and the first surface 120. The third surface 150 is also connected with the light emitting surface 110 and the first surface 120. The opening 130, in addition to extending from the first surface 120 towards the light emitting surface 110, may further be extending from the second surface 140 towards the third surface 150. Furthermore, as shown in FIG. 4A, the opening 130 may selectively pass through the second surface 140 and the third surface 150. In the embodiment, the opening 130 may be a strip-shaped recess. However, the invention is not limited thereto, and an appearance of the opening 130 may be properly changed depending on the actual need. Moreover, if ignoring the part of opening 130, the appearance of the light guide plate 100 of the embodiment may generally be a rectangular parallelepiped. In other words, as shown in FIG. 4A, the light emitting surface 110 may be parallel to the first surface 120. However, the invention is not limited thereto, and FIG. 4B illustrates a light guide plate according to another embodiment of the invention. Referring to FIG. 4B, if ignoring the part of opening 130, the appearance of a light guide plate 100' of the embodiment may generally be similar to a wedge plate. In other words, as shown in FIG. 4B, the light emitting surface 110 is not parallel to the first surface 120. It is to be explained that the light guide plates illustrated in FIG. 4A and FIG. 4B are just provided as examples. The appearance of the light guide plate in the invention may be properly designed depending on the actual need, and are not limited to the light guide plates illustrate in FIG. 4A and FIG. 4B.

Referring to FIG. 1 and FIG. 2 again, the light emitting devices 200 are disposed in the openings 130 and arranged along an arranging direction D (illustrated in FIG. 1). The light emitting surface 110 and the first surface 120 may locate on two planes parallel to a xy plane, and the arranging direction D may be parallel to an x direction. In other words, the arranging direction D of the light emitting devices 200 may be the same as one of the extending directions of the openings 130. As shown in FIG. 2, most of the light beams L emitted by the light emitting device 200 may enter the light guide plate 100 through two opposite side walls 132 of the opening 130. The light beams L that entered the light guide plate 100 may leave the light guide plate 100 from the light emitting surface 110 via an optical microstructure 160. In the embodiment, the light emitting devices 200 may be light emitting diodes. However, the invention is not limited thereto.

Figure 5:
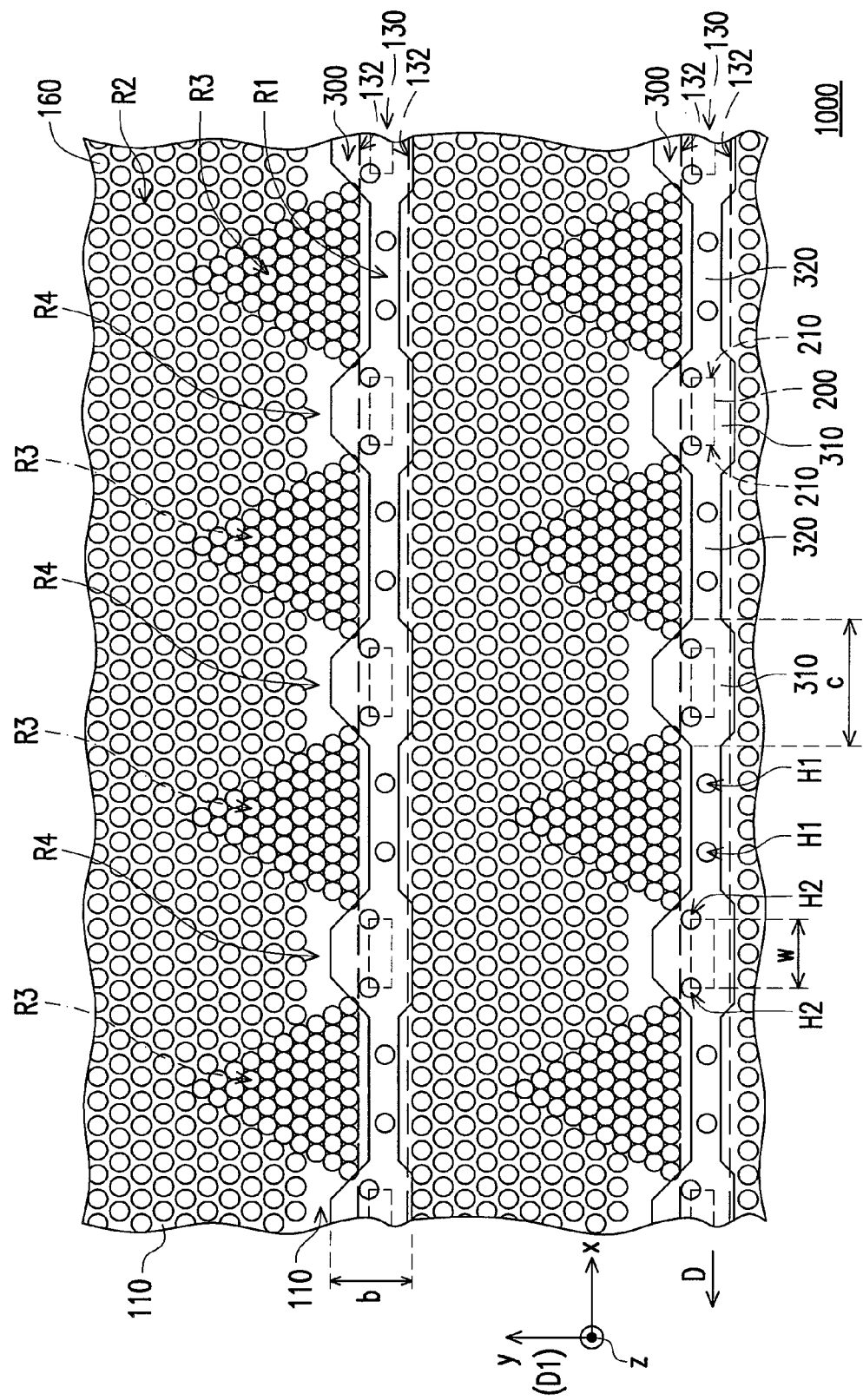
FIG. 5 is a top perspective view of the light source module in FIG. 1.

For the purpose of clear indication, illustrations of the optical film 400, an absorbing pattern element 500, a reflecting element 600, and a driving circuit board 700 are omitted in FIG. 5 (relevant illustrations please refer to the following descriptions). Referring to FIG. 1 and FIG. 5, the light-controlling pattern elements 300 of the embodiment are disposed on the light emitting surface 110 and cover the openings 130 and the light emitting devices 200. In the embodiment, an extending direction of the light-controlling pattern elements 300 may be the same as the arranging direction D of the light emitting devices 200. Furthermore, each of the light-controlling pattern elements 300 includes a wide portion 310 and a slender portion 320 connected with the wide portion 310, wherein an orthographic projection of the wide portion 310 towards the direction of the light emitting surface 110 overlaps the light emitting device 200, and when the wide portion 310 and the slender portion 320 are in multiple amounts, the slender portions 320 are alternatively arranged with the wide portions 310. As shown in FIG. 5, a first region R1 is existed between any two adjacent light emitting devices 200, and the slender portion 320 overlaps the first region R1.

Figure 7:
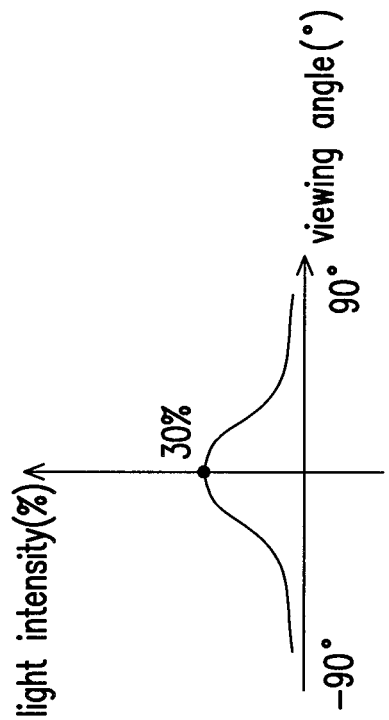
FIG. 7 illustrates a light intensity distribution of the light beams emitted by the light emitting device in FIG. 1 after passing through the light guide plate and a light-controlling pattern element.
Figure 6:
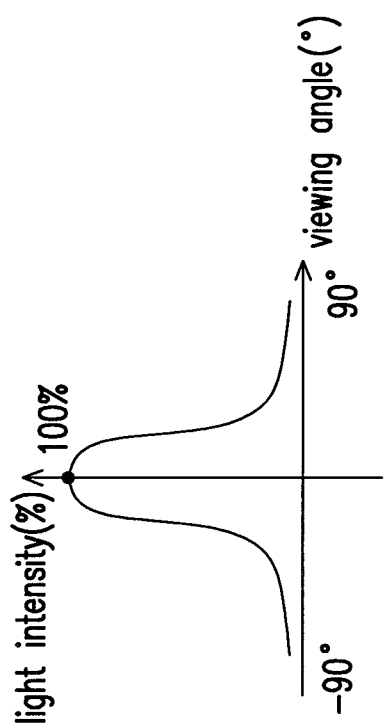
FIG. 6 illustrates a light intensity distribution of light beams emitted by the light emitting device in FIG. 1 before passing through any component.

The light-controlling pattern element 300 of the embodiment has a function of adjusting the light intensity distribution emitted by the light emitting device 200. Furthermore, a light intensity difference of the light beams emitted by the light emitting device 200 in each direction is reduced after passing through the light-controlling pattern element 300, so that a problem of being overly bright of the top of the light emitting device 200 is prevented. Please refer to FIG. 6 and FIG. 7. It may be seen from FIG. 6 that the light intensity distributions of the light beams emitted by the light emitting device 200 are focused in a frontal direction (viz. z direction of FIG. 1) before passing through any elements,. It may be seen from FIG. 7 that a light intensity difference of the light beams emitted by the light emitting device 200 in each direction is reduced after passing through the light guide plate 100 and the light-controlling pattern element 300. In other words, through the light-controlling pattern element 300, the light source module 1000 of the embodiment is less prone to a problem of being overly bright at the tope of the light emitting device 200.

The light-controlling pattern element 300 of the embodiment may have a function of reflecting the light beams. The light-controlling pattern element 300 may also have a function of scattering the light beams. In addition, the light-controlling pattern element 300 may further have a function of absorbing the light beams. For example, the light-controlling pattern element 300 of the embodiment is a white reflective sheet adhered on the light emitting surface 110. However, the invention is not limited thereto, in other embodiments, the light-controlling pattern element 300 may also be a translucent scattering pattern (a reflectivity thereof may be higher than 70%), a silver reflective sheet, a metal pattern deposited on the light emitting surface 110, or a pattern formed on the light emitting surface 110 via printing or ink jet method.

As shown in FIG. 5, in the embodiment, a width of the wide portion 310 in the first direction D1 may be gradually reduced from two opposite edges 210 of the light emitting device 200 towards the slender portions 320 at the two sides of the wide portion 310. In the embodiment, the first direction D1 is substantially perpendicular to the arranging direction D. The wide portion 310 may have two second holes H2. The two second holes H2 expose a portion of the light emitting device 200. A width of a portion of the wide portion 310 between the two second holes H2 may the same in the first direction D1, wherein the wide portion 310 may appear to be a wide flat octagon, and the slender portions 320 may appear to be rectangles. However, the invention is not limited thereto, and in other embodiments, appearances of the wide portion 310 and the slender portions 320 may be adjusted depending on the actual need.

Continually referring to FIG. 1 and FIG. 5, any maximum width of the wide portion 310 in the first direction D1 is b (labeled in FIG. 5), and a thickness of the light guide plate is g (labeled in FIG. 1). In the embodiment, b and g may satisfy the following formula (1): $b \leq 2g$. Any maximum width of the wide portion 310 in the arranging direction D (e.g., a direction parallel to the x direction) is c (labeled in FIG. 5). A value of the width c may be designed in consideration of the width w (labeled in FIG. 5) of the light emitting device 200 in the arranging direction D. In detail, in the embodiment, c, w and g may satisfy the following formula (2): c≥2g+0.5w. When b, c, w and g satisfy any of the corresponding formula (1) and formula (2), the light source module 1000 is less prone to a light leakage problem under a large viewing angle. Moreover, referring to FIG. 1, in the embodiment, a shortest distance from the light emitting surface 110 to the optical film 400 is h, and a thickness of the light guide plate is g, wherein h and g satisfy: g≤h≤3g. Herein, a uniformity of the light source module 1000 is favorable.

Referring to FIG. 1 and FIG. 2, the light source module 1000 of the embodiment may selectively include at least one optical film 400. The light-controlling pattern element 300 is disposed between the light emitting surface 110 and the optical film 400. A shortest distance from the light emitting surface 110 to the optical film 400 is h. When a portion (viz. the slender portion 320 labeled in FIG. 5) of the light-controlling pattern element 300 overlapped with the first region R1 (labeled in FIG. 5) may have at least one first hole H1, a shortest distance between an edge of the first hole H1 and an edge of the light-controlling pattern element is d1, wherein d1 and h may satisfy the following formula (3): d1 ≤h. When the portion of the light-controlling pattern element 300 overlapped with the first region R1 has at least two first holes H1, a shortest distance between edges of the two first holes H1 is d1', wherein d1' and h may satisfy the following formula (4): d1'≤h.

In the embodiment, a portion (viz. the wide portion 310 labeled in FIG. 5) of the light-controlling pattern element 300 overlapped with any emitting device 200 may have at least one second hole H2. As shown in FIG. 2, the second hole H2 exposes the light emitting device 200. A shortest distance between an edge of the second hole H2 and an edge of the light-controlling pattern element 300 is d2, wherein d2 an d h may satisfy the following formula (5): d2≤h. In the embodiment, the portion of the light-controlling pattern element 300 overlapped with any light emitting device 200 may have two second holes H2. A shortest distance between edges of the two second holes H2 is d2', wherein d2' and h may satisfy the following formula (6): d2'≤h. The light-controlling pattern element 300 may prevent an excessive amount of the light beams leave the light guide plate 100 from the top of the light emitting device 200, and thus improve a problem of a conventional light source module being overly bright at the tope of the light emitting device. Moreover, by designing the first hole H1, the second hole H2 or a combination thereof on the design of the light-controlling pattern element 300, a small portion of the light beams is enabled to leave the light guide plate 100 from the top of the light emitting device 200, thereby preventing a region corresponded to light-controlling pattern element 300 in the light source module 100 from a problem of having dark band. In addition, when d1, d1 d2, d2' and h satisfy any of the corresponding formula (3), formula (4), formula (5) and formula (6), the light source module 1000 is also less prone to a problem of uneven light mixing.

Referring to FIG. 5 again, the light guide plate 100 of the embodiment further has a plurality of optical microstructures 160. In the embodiment, the optical microstructures 160 may be disposed at the light emitting surface 110. However, the invention is not limited thereto, and in other embodiments, the optical microstructures 160 may also be disposed on the first surface 120. The optical microstructures 160 of the embodiment may be printing mesh points, inkjet dots, or microstructures formed on the light guide plate, but the invention is not limited thereto.

As shown in FIG. 5, the light emitting surface 110 of the embodiment has at least one second region R2 and a plurality of third regions R3. The third regions R3 are located between slender portions 320 and the second region R2. In the embodiment, the third regions R3 may be triangular regions, and the second region R2 may be an irregular region adjacent to these triangular regions. A density of the optical microstructures 160 in the third regions R3 may be greater than a density of the optical microstructures 160 in the second regions R2. Furthermore, the light emitting surface 110 may have at least one second region R2, a plurality of third regions R3, and a plurality of fourth regions R4, wherein the fourth regions R4 are jointly surrounded by the second regions R2, the third regions R3, and the wide portion 310. In the embodiment, the optical microstructures 160 may be disposed in the second region R2 and the third regions R3, and no optical microstructure is disposed in the fourth regions R4.

Referring to FIG. 1 and FIG. 2 again, the light source module 1000 of the embodiment may further include the absorbing pattern element 500. The opening 130 faces towards the absorbing pattern element 500. In other words, the first surface 120 is located between the absorbing pattern element 500 and the light emitting surface 110. The absorbing pattern element 500 is disposed beside the light emitting device 200 and extends from the side walls 132 of the opening 130 of the light emitting device 200. In the embodiment, the absorbing pattern element 500 may surround the light emitting device 200 and cover the two opposite side walls 132 of the opening 130. As shown in FIG. 2, a width of the absorbing pattern element 500 in first direction D1 is p, a width of the opening 130 in the first direction D1 is r, and a shortest distance from a light emitting surface of the light emitting device 200 to the side wall 132 is q. In the embodiment, p, q and r may satisfy the following formula (7): 0.5≤q≤2r.

The light source module 1000 of the embodiment may further include the reflecting element 600. The opening 130 faces towards the reflecting element 600. In other words, the first surface 120 is located between the reflecting element 600 and the light emitting surface 110. In the embodiment, reflecting element 600 may have a plurality of through holes 610. The light emitting device 200 may pass the through holes 610 and be disposed in the opening 130. The absorbing pattern element 500 of the embodiment may be located between the reflecting element 600 and the first surface 120. Specifically, the absorbing pattern element 500 of the embodiment may be in contact with the reflecting element 600 and surrounded at edges of the through holes 610. As shown in FIG. 2, the absorbing pattern element 500 may block a portion of the light beams L transmitting to the reflecting element 600, so that bright stripes are less likely to be appeared on the tope of the light emitting device 200. In addition, the light beams L from a light emitting device 200' have a higher chance of being absorbed by the absorbing pattern element 500 beside the light emitting device 200 when the light beams L exit from the light guide plate 100 and enter the opening 130, so that the bright stripes are less like to be appeared on the tope of the light emitting device 200. As such, the uniformity of the light source module 1000 of the embodiment may be enhanced obviously.

Figure 8:
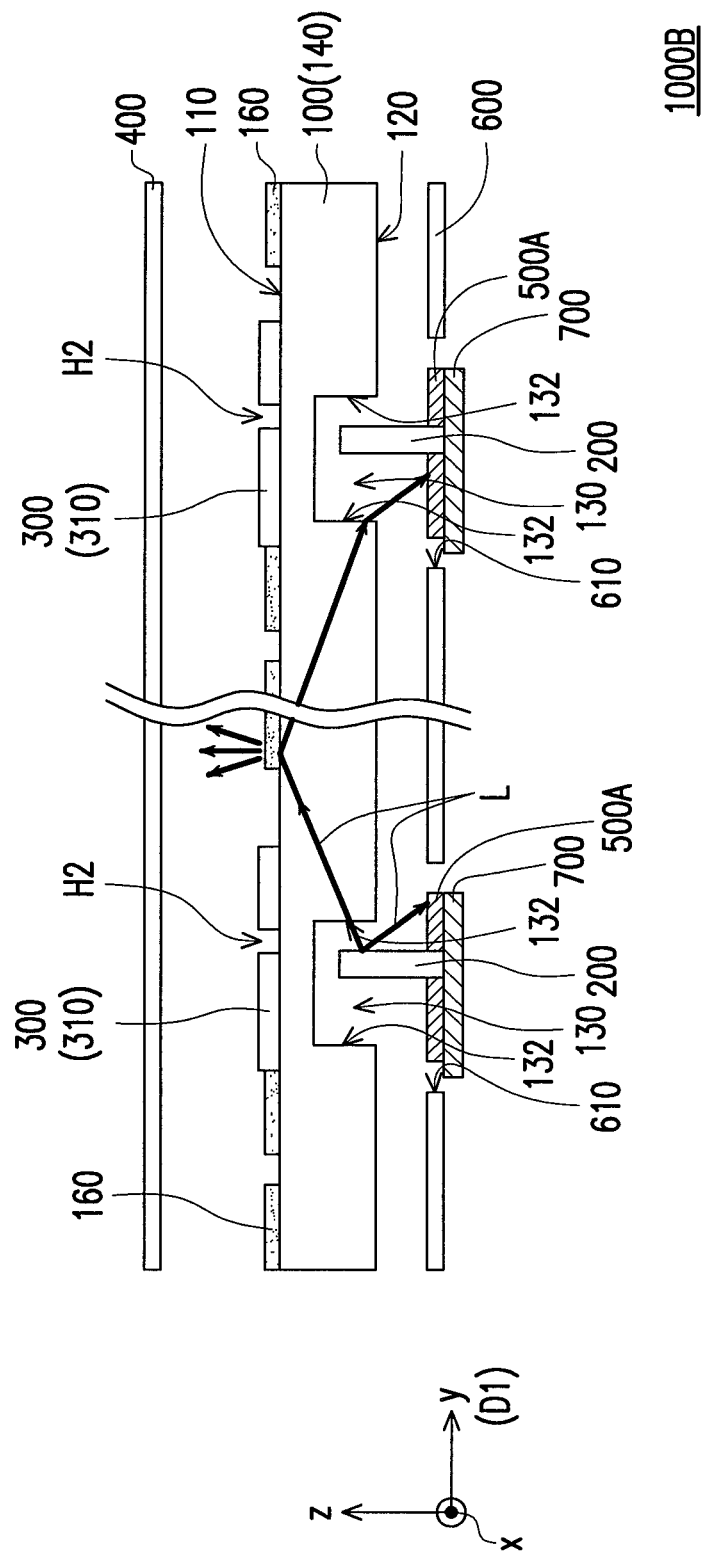
FIG. 8 is a partial side view of a light source module according to another embodiment of the invention.

It is noted that a position of the absorbing pattern element 500 is not limited to positions illustrated in FIG. 1 and FIG. 2. Referring to FIG. 8, a light source module 1000B in FIG. 8 is similar to the light source module 1000 in FIG. 2, and therefore the same elements are represented with the same notations. A difference between the light source module 1000B and the light source module 1000 is that: a position of an absorbing pattern element 500A is different from a position of the absorbing pattern element 500. In detail, the light source module 1000B may further include the driving circuit board 700. The driving circuit board 700 is electrically connected with the light emitting devices 200. The through holes 610 of the reflecting element 600 may expose the driving circuit board 700 and the absorbing pattern element 500A. The absorbing pattern element 500A may be located between the driving circuit board 700 and the first surface 120. The absorbing pattern element 500A has similar effects as the absorbing pattern element 500, and thus is not repeated herein.

Second Embodiment

Figure 9:
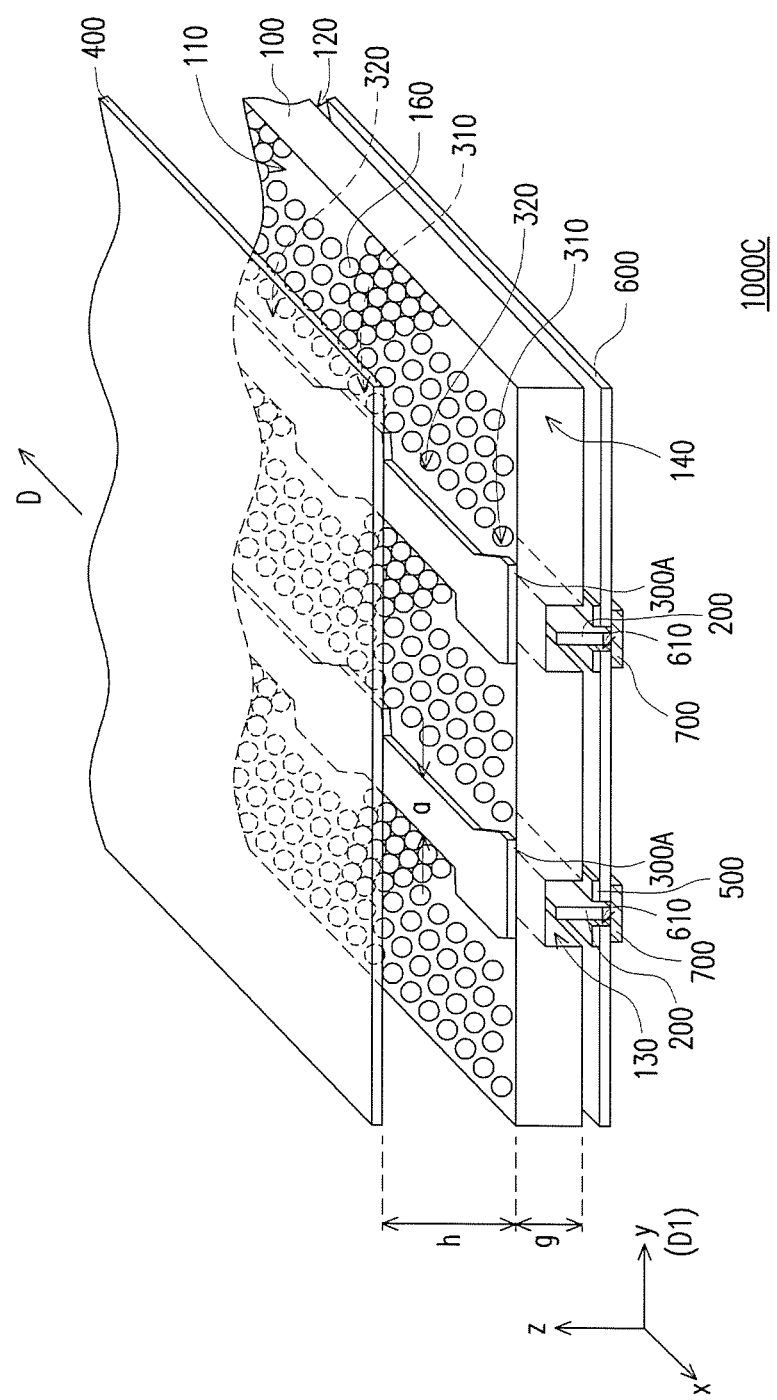
FIG. 9 is a partial schematic perspective view of a light source module according to another embodiment of the invention.
Figure 10:
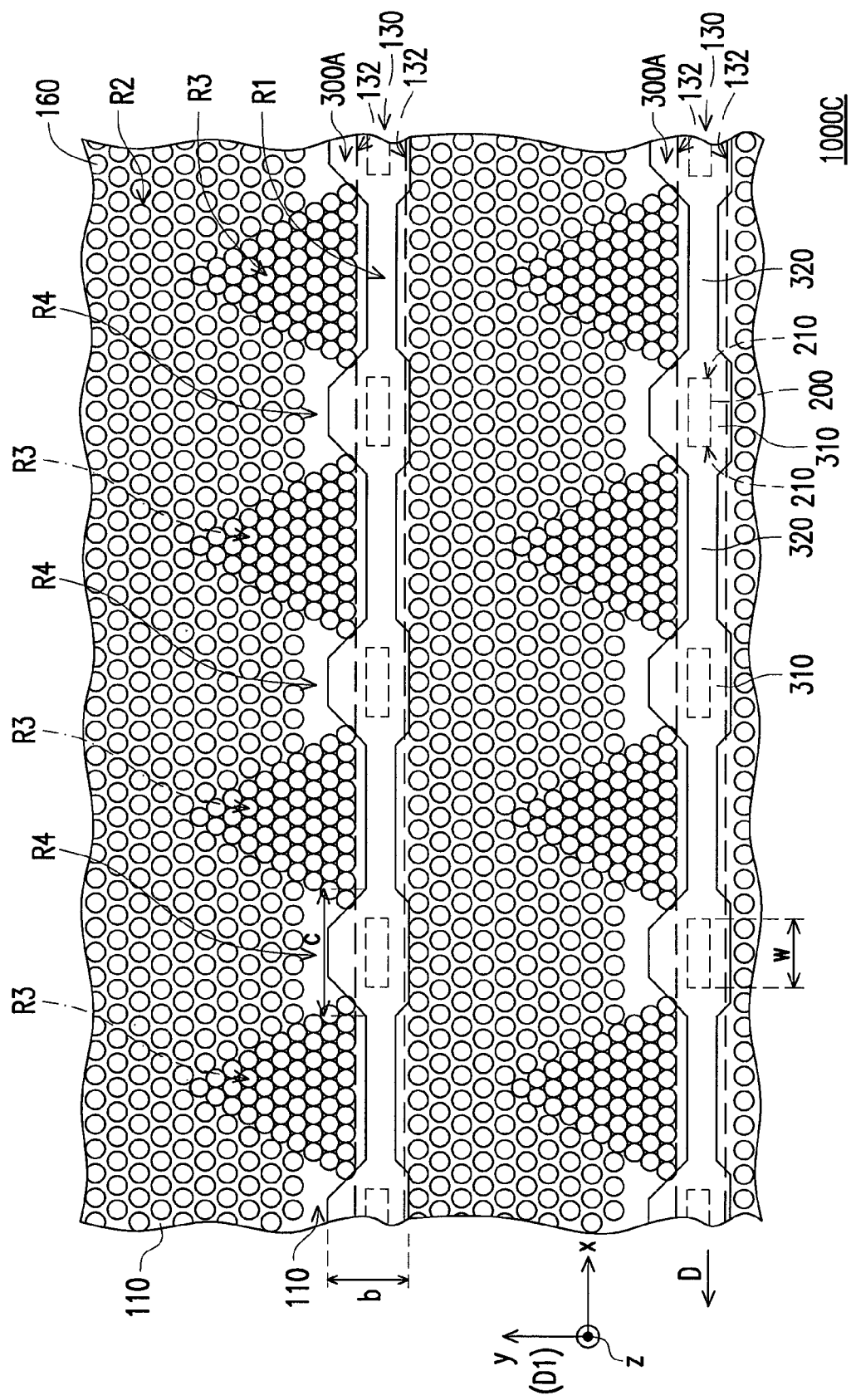
FIG. 10 is a top perspective view of the light source module in FIG. 9.

Please refer to FIG. 9 and FIG. 10. For a clear representation, illustrations of the optical film 400, the absorbing pattern element 500, the reflecting element 600, and the driving circuit board 700 are omitted in FIG. 10. A light source module 1000C of the embodiment is similar to the light source module 1000 of the first embodiment, and therefore the same elements are represented with the same notations. A main difference between the light source module 1000C and the light source module 1000 is that: light-controlling pattern elements 300A of the light source module 1000C are a bit different from the light-controlling pattern elements 300 of the light source module 1000. The following below illustrates the difference between the two, whereas the similarities thereof are not to be repeated.

The light-controlling pattern elements 300A of the embodiment may have no openings. A minimum width of a portion of the light-controlling pattern elements 300A overlapped with the first region R1 in the first direction D1 is a. A shortest distance from the light emitting surface 110 to the optical film 400 is h. Wherein, a and h may satisfy the following formula (7): $a \leq h$. When a and h satisfy the formula (7), in the light source module 1000C, a light mixing distance between the two opposite sides of the light-controlling pattern element 300A is enough, and the light source module 1000C is less likely to have a problem of poor uniformity. Moreover, the light guide plate 100 of the embodiment may be integrally formed. However, the invention is not limited thereto, and in other embodiment, the light guide plate 100 may also be spliced. In addition, the light source module 1000C has effects and benefits similar to that of the light source module 1000, and thus is not to be repeated herein.

In the above-mentioned embodiment, the light-controlling pattern element has the wide portion and the slender portions; however, in other embodiments, the light-controlling pattern element is not limited to having the wide portion and the slender portion, the light-controlling pattern element may be designed as a polygon, an irregular-shape, a circle, or an oval-shape according to different needs, and the light-controlling pattern element may also not include a slender portion, or have the opening on the slender portion or the wide portion.

In summary, the light source module of an embodiment of the invention may effectively avoid the light source module to have a problem of uneven light mixing near the light-controlling pattern element by properly designing the width of the light-controlling pattern element and the shortest distance between the light guide plate and the optical film.

In the light source module of another embodiment of the invention, the absorbing pattern element may be disposed at the periphery of the light emitting device. This absorbing pattern element may absorb a portion of the light beams transmitting to the reflecting element, thereby improving the problem of the conventional light source module being overly bright at the tope of the light emitting device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module comprising:
    a light guide plate having a light emitting surface, a first surface opposite the light emitting surface, and at least one opening, wherein the opening passes through the first surface and extends from the first surface to the light emitting surface;
    at least one light emitting device disposed in the opening and arranged along an arranging direction;
    a light-controlling pattern element disposed on the light emitting surface and covering the opening and the light emitting device, wherein the light-controlling pattern element comprises a wide portion and a slender portion connected with the wide portion, and an orthographic projection of the wide portion towards a direction of the light emitting surface overlaps the light emitting device completely; and
    at least one optical film, the light-controlling pattern element disposed between the light emitting surface and the optical film, a minimum width of the light-controlling pattern element in a first direction being a, the first direction intersected with the arranging direction, and a shortest distance from the light emitting surface to the optical film being h, wherein a and h satisfy a≤h.

2. The light source module as recited in claim 1, wherein the light-controlling pattern element has at least one first hole, a shortest distance between an edge of the first hole and an edge of the light-controlling pattern element is d1, and d1 and h satisfy d1 ≤h.

3. The light source module as recited in claim 1, wherein the light-controlling pattern element has at least two first holes, a shortest distance between edges of the first holes is d1', and d1' and h satisfy d1' ≤h.

4. The light source module as recited in claim 1, wherein a portion of the light-controlling pattern element overlapping the light emitting device has at least one second hole, and the at least one second hole exposes a portion of the light emitting device.

5. The light source module as recited in claim 4, wherein a shortest distance between an edge of the second hole and an edge of the light-controlling pattern element is d2, and d2 and h satisfy d 2 ≤h.

6. The light source module as recited in claim 4, wherein the at least one second hole is two second holes, a shortest distance between edges of the second holes is d2', and d2' and h satisfy d2' ≤h.

7. The light source module as recited in claim 1, wherein the at least one light emitting device is a plurality of light emitting devices, a first region is existed between any two of the adjacent light emitting devices, and the slender portion overlaps the first region.

8. The light source module as recited in claim 1, wherein a maximum width of the wide portion in the first direction is b, a thickness of the light guide plate is g, and b and g satisfy b >2g.

9. The light source module as recited in claim 1, wherein the at least one light emitting device is a plurality of light emitting devices, a maximum width of the wide portion in the arranging direction is c, a width of any one of the light emitting devices in the arranging direction is w, a thickness of the light guide plate is g, and c, w, and g satisfy c>2g+0.5w.

10. The light source module as recited in claim 1, wherein a thickness of the light guide plate is g, and h and g satisfy g≤h≤3g.

11. The light source module as recited in claim 1, wherein the first direction is substantially perpendicular to the arranging direction.

12. The light source module as recited in claim 1 further comprising:
an absorbing pattern element, the opening facing towards the absorbing pattern element, and the absorbing pattern element disposed besides the light emitting device and extending toward a side wall of the opening.

13. A light source module comprising:
a light guide plate having a light emitting surface, a first surface opposite the light emitting surface, and at least one opening, wherein the opening passes through the first surface and extends from the first surface toward the light emitting surface;
at least one light emitting device disposed in the opening and arranged along an arranging direction;
a light-controlling pattern element disposed on the light emitting surface and covering the opening and the light emitting device, wherein the light-controlling pattern element comprises a wide portion and a slender portion connected with the wide portion, and an orthographic projection of the wide portion towards a direction of the light emitting surface overlaps the light emitting device completely; and
an absorbing pattern element, the opening facing towards the absorbing pattern element, the absorbing pattern element disposed besides the light emitting device and extending toward a side wall of the opening.

14. The light source module as recited in claim 13 further comprising a reflecting element, the opening facing towards the reflecting element, the reflecting element having a through hole, and the light emitting device penetrated through the through hole and disposed in the opening.

15. The light source module as recited in claim 14 further comprising:
a driving circuit board electrically connected with the light emitting device, the through hole exposing the driving circuit board, and the absorbing pattern element located between the driving circuit board and the first surface.

16. The light source module as recited in claim 13 further comprising:
a reflecting element, the opening facing towards the reflecting element, and the absorbing pattern element located between the reflecting element and the first surface.

17. The light source module as recited in claim 13 further comprising:
at least one optical film, the light-controlling pattern element disposed between the light emitting surface and the optical film, a shortest distance from the light emitting surface to the optical film being h, a minimum width of the light-controlling pattern element in a first direction being a, and the first direction intersected with the arranging direction, wherein a and h satisfy a≤h.

18. The light source module as recited in claim 17, wherein the first direction is substantially perpendicular to the arranging direction.

19. The light source module as recited in claim 13 further comprising:
at least one optical film, the light-controlling pattern element disposed between the light emitting surface and the optical film, a shortest distance from the light emitting surface to the optical film being h, the light-controlling pattern element having at least one first hole, and a shortest distance between an edge of the first hole and an edge of the light-controlling pattern element being d1, wherein d1 and h satisfy d1≤h.

20. The light source module as recited in claim 13 further comprising:
at least one optical film, the light-controlling pattern element disposed between the light emitting surface and the optical film, a shortest distance from the light emitting surface to the optical film being h, the light-controlling pattern element having at least two first holes, and a shortest distance between edges of the first holes being d1', wherein d1' and h satisfy d1' ≤h.

21. The light source module as recited in claim 13, wherein a portion of the light-controlling pattern element overlapping the light emitting device has at least one second hole, and the at least one second hole exposes a portion of the light emitting device.

22. The light source module as recited in claim 21 further comprising:
at least one optical film, the light-controlling pattern element disposed between the light emitting surface and the optical film, a shortest distance from the light emitting surface to the optical film being h, and a shortest distance between an edge of the second hole and an edge of the light-controlling pattern element being d2, wherein d2 and h satisfy d2≤h.

23. The light source module as recited in claim 21 further comprising:
at least one optical film, the light-controlling pattern element disposed between the light emitting surface and the optical film, a shortest distance from the light emitting surface to the optical film being h, the at least one second hole is two second holes, and a shortest distance between edges of the second holes being d2', wherein d2' and h satisfy d2' ≤h.

24. The light source module as recited in claim 13, wherein the at least one light emitting device is a plurality of light emitting devices, a first region is existed between any two of the adjacent light emitting devices, and the slender portion overlaps the first region.

25. The light source module as recited in claim 13, wherein a maximum width of the wide portion in a first direction is b, the first direction intersects with the arranging direction, a thickness of the light guide plate is g, and b and g satisfy b>2g.

26. The light source module as recited in claim 13, wherein the at least one light emitting device is a plurality of light emitting devices, a maximum width of the wide portion in the arranging direction is c, a width of any one of the light emitting devices in the arranging direction is w, a thickness of the light guide plate is g, and c, w, and g satisfy c>2g+0.5w.

27. The light source module as recited in claim 13 further comprising:
at least one optical film, the light-controlling pattern element disposed between the light emitting surface and the optical film, a shortest distance from the light emitting surface to the optical film being h, and a thickness of the light guide plate being g, wherein h and g satisfy g≤h≤3g.

28. A light source module comprising:
a light guide plate having a light emitting surface, a first surface opposite the light emitting surface and at least one opening, wherein the opening passes through the first surface and extends from the first surface toward the light emitting surface;
at least one light emitting device disposed in the opening and arranged along an arranging direction;
a light-controlling pattern element disposed on the light emitting surface and covering the opening and the light emitting device, the light-controlling pattern element having at least one first hole, and a shortest distance between an edge of the at least one first hole and an edge of the light-controlling pattern element being d1, wherein the light-controlling pattern element comprises a wide portion and a slender portion connected with the wide portion, and an orthographic projection of the wide portion towards a direction of the light emitting surface overlaps the light emitting device completely; and
at least one optical film, the light-controlling pattern element disposed between the light emitting surface and the optical film, a shortest distance from the light emitting surface to the optical film being h, wherein d1 and h satisfy d1≤h.

29. The light source module as recited in claim 28, wherein the first direction is substantially perpendicular to the arranging direction.

30. The light source module as recited in claim 28, wherein the at least one light emitting device is a plurality of light emitting devices, a first region is existed between any two of the adjacent light emitting devices, a minimum width of a portion of the light-controlling pattern element overlapping the first region in the first direction is a.

31. The light source module as recited in claim 30 further comprising:
an absorbing pattern element, the opening facing towards the absorbing pattern element, the absorbing pattern element disposed besides the light emitting devices and extending toward a side wall of the opening.

32. The light source module as recited in claim 28, wherein the at least one first hole is two first holes, a shortest distance between edges of the first holes is d1', and d1' and h satisfy d1'≤h.

33. The light source module as recited in claim 28, wherein the portion of the light-controlling pattern element overlapping the light emitting device has at least one second hole, and the at least one second hole exposes a portion of the light emitting device.

34. The light source module as recited in claim 33, wherein a shortest distance between an edge of the second hole and an edge of the light-controlling pattern element is d2, and d2 and h satisfy d2 ≤h.

35. The light source module as recited in claim 33, wherein the at least one second hole is two second holes, a shortest distance between edges of the second holes is d2', and d2' and h satisfy d2'≤h.

36. The light source module as recited in claim 28, wherein the at least one light emitting device is a plurality of light emitting devices, a first region is existed between any two of the adjacent light emitting devices, and the slender portion overlaps the first region.

37. The light source module as recited in claim 36, wherein a maximum width of the wide portion in the arranging direction is c, a width of any one of the light emitting devices in the arranging direction is w, a thickness of the light guide plate is g, and c, w, and g satisfy c>2g+0.5w.

38. The light source module as recited in claim 28, wherein a maximum width of the wide portion in a first direction is b, the first direction intersects with the arranging direction, a thickness of the light guide plate is g, and b and g satisfy b>2g.

39. The light source module as recited in claim 28, wherein a thickness of the light guide plate is g, and h and g satisfy g≤h≤3g.

* * * * *